United States Patent [19]
Moon

[11] 3,793,832
[45] Feb. 26, 1974

[54] NUCLEAR ENGINE REACTOR ROCKET CORES

[75] Inventor: Calvin W. Moon, Greenhills, Ohio

[73] Assignee: The United States of America as represented by the Secretary of the Air force, Washington, D.C.

[22] Filed: July 23, 1968

[21] Appl. No.: 747,784

[52] U.S. Cl. .................................. 60/203, 176/59
[51] Int. Cl. ..................................................... G21d
[58] Field of Search ................ 60/203; 176/56, 59

[56] References Cited
UNITED STATES PATENTS

| | | | |
|---|---|---|---|
| 3,108,054 | 10/1963 | Blackman, Jr. | 60/203 |
| 3,178,354 | 4/1965 | Vamn et al. | 176/59 |
| 3,286,468 | 11/1966 | Plebuch | 60/203 |

Primary Examiner—Samuel Feinberg

[57] ABSTRACT

A nuclear rocket engine reactor core equipped with a series of coolant channels having hydraulic diameters that decrease in programmed proportion with increasing radial position from the core center to thereby reduce the required propellant coolant flow to a minimum during the aftercooling period occurring after reactor shutdown.

4 Claims, 10 Drawing Figures

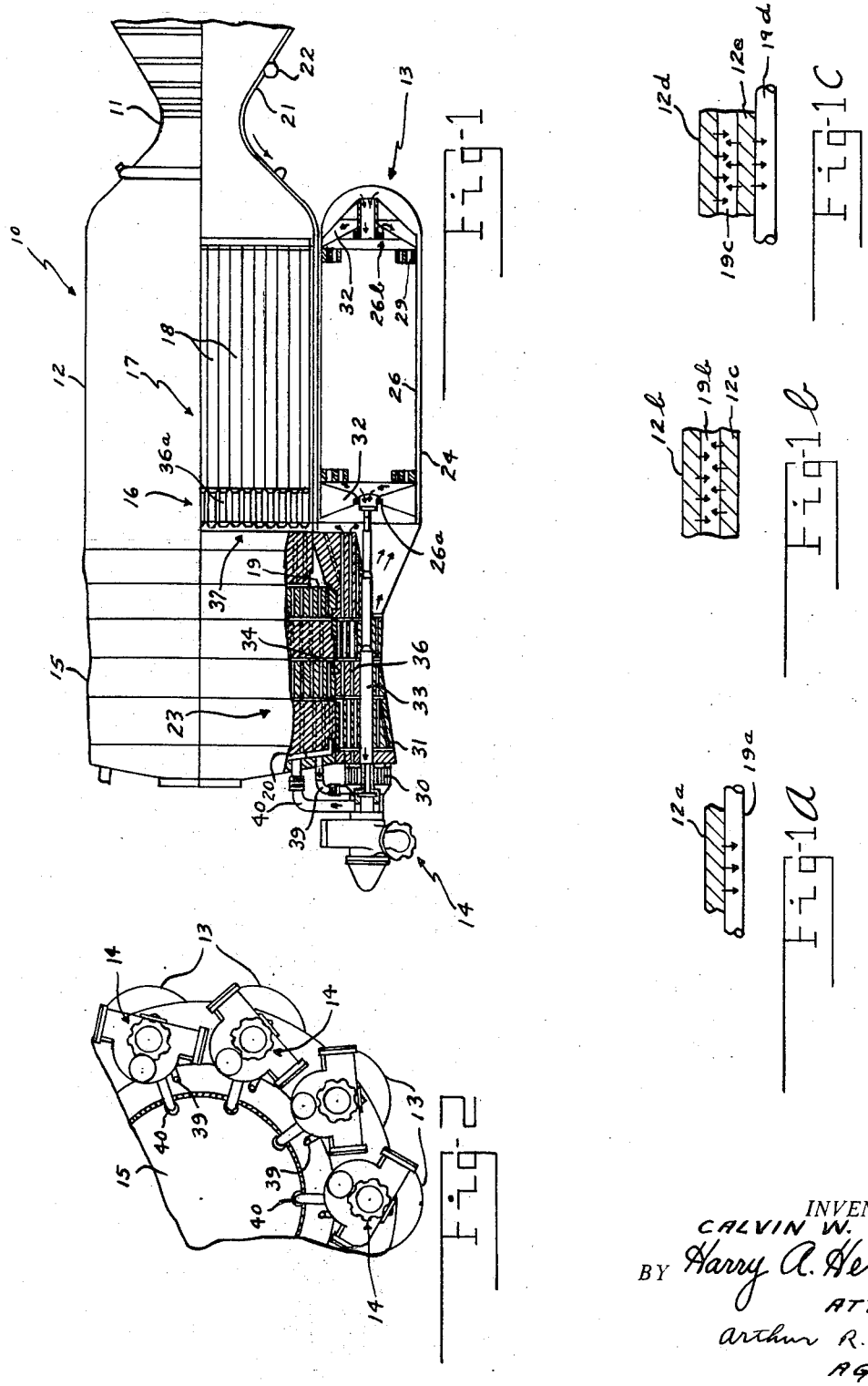

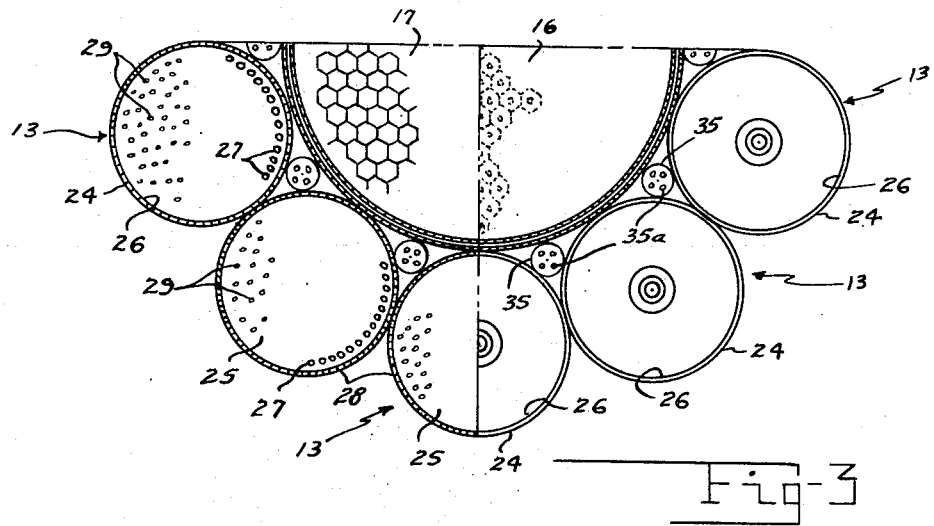
Fig-3
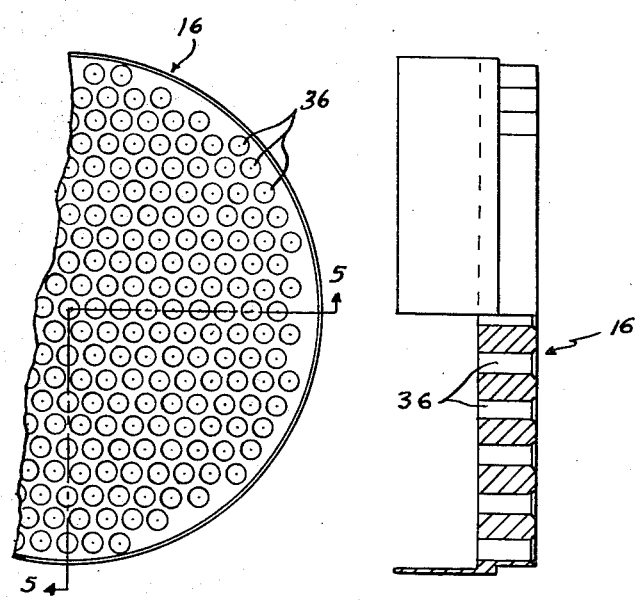
Fig-4
Fig-5
INVENTOR.
CALVIN W. MOON
BY Harry A. Herbert Jr
ATTORNEY
Arthur R. Parker
AGENT

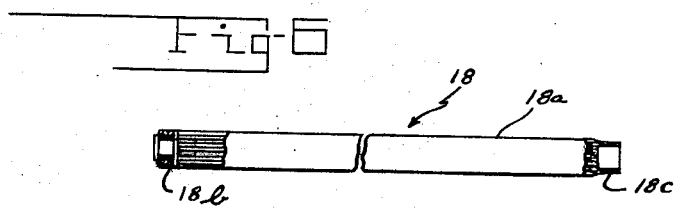
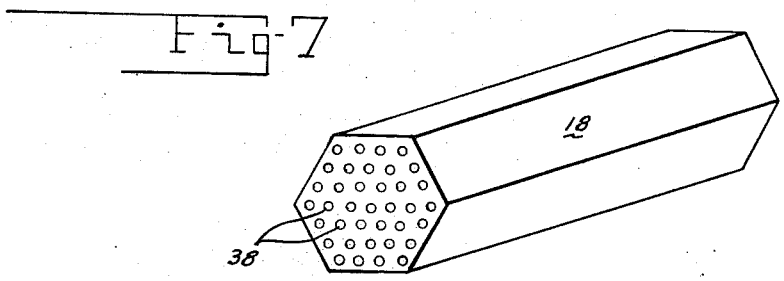

NUCLEAR ENGINE REACTOR ROCKET CORES

BACKGROUND OF THE INVENTION

This invention relates generally to nuclear-powered rocket engines and, in particular, to improved means for achieving more uniform temperatures in the nuclear reactor core during the after cooling period.

The ever increasing development in the nuclear propulsion field involving the use of nuclear reactors as heat sources for providing the propulsion means involves, among others, the problem of reducing the heat occurring particularly in the exit nozzle area of the engine after a particular power operation has ceased, or in other words, after the reactor has been shut down; of course, this problem could be eliminated by designing the nuclear-powered engine for a one time operation only. However, such a solution would be too costly and if one is to design such an engine with a restart capability, the structural integrity particularly in the nozzle itself and the surrounding engine structure must be preserved through some prefereably simplified cooling means.

The present invention generally solves this problem of aftercooling with a minimum of complexity being added to the overall engine system by the addition of extra hydrogen propellant to the main propellant supply tank for the engine. A unique system of coolant passages is utilized in an improved combination arrangement, as will be hereinafter discussed in the following summary and detailed description.

SUMMARY OF THE INVENTION

A principal object of the present invention, therefore, resides in the development of a new and improved nuclear rocket engine-reactor assembly having a uniquely-arranged and more simplified combination preferably consisting of a single reactor pressure shell incorporating a series of individual side reflector module elements in novel arrangement with an improved reactor core made up of a plurality of variable porosity and variable hydraulic diameter fuel elements to thereby effect an improved nuclear rocket performance during the after cooling operational mode.

A further object of the invention is in the utilization of a novel nuclear reactor-powered rocket engine having, in a preferred embodiment thereof, a main reactor pressure shell element formed as an integral forward extension of the engine nozzle and incorporating a plurality of coolant tubes and further being in unique combination with a new and improved reactor core having variations in both coolant passage spacings and diameters arranged in a predetermined manner to effect an increased average temperature of the coolant propellant at the exit from the core during the aftercooling period.

Other objects and advantages of the invention will become readily apparent hereinafter in connection with the following disclosure, in which:

BRIEF DESCRIPTION OF THE DRAWING

FIG. 1 is a longitudinal sectional view, partly broken away, of an overall assembly of a single pressure shell, nuclear-reactor engine utilizable with the present invention;

FIGS. 1a, 1b and 1c, respectively, indicate three somewhat schematic mounting arrangements that may be made between the pressure shell element of the overall assembly of FIG. 1, and each of a series of coolant tubes utilized therewith;

FIG. 2 is a front end view, partly broken away and schematic in form, of the assembled engine of FIG. 1, illustrating further details of a specific arrangement between a series of side reflector module elements that may be supported on the outside circumference of the reactor pressure shell, and additionally, illustrating a relationship therewith of one type of control drum actuator and flexible tube elements that may be respectively used to control the neutron emission from the reactor core, and the transmission of coolant between certain of the reactor assembly units.

FIG. 3 is a cross sectional rear end view, partly broken away, generally illustrating additional details of the nuclear reactor powered rocket engine of FIG. 1 and, in particular, more clearly showing the specific and unique relationships between the major reactor assembly components utilized with the overall assembly view of FIG. 1;

FIG. 4 represents a detailed upright view of a forward tube sheet element that may be used with the assembled view of FIG. 1 for supporting the reactor core-fuel elements of the present invention in their correct position;

FIG. 5 is a second view of the forward tube sheet element of FIG. 4, partly broken away and cross sectional in form, and taken about on line 5—5 thereof, and generally illustrating more clearly the overall configuration thereof, and in particular, showing the formation of counterbored holes therein utilized to provide the support for the one end of the reactor-core fuel elements;

FIG. 6 is a longitudinal view, partly broken away and schematic in form, showing details of a representative example of one type of the several fuel elements forming the active portion of the inventive reactor core portion of FIG. 1; and FIG. 7 is a side perspective and schematic view of the fuel element of FIG. 6, showing one cross-sectional configuration thereof and further illustrating a plurality of coolant passages incorporated therein.

DESCRIPTION OF THE PREFERRED EMBODIMENT

Referring to the drawing and, in particular, to FIGS. 1 and 2 thereof, one type of nuclear-powered, rocket engine reactor-shield assembly utilizable with the present invention is indicated generally at 10 as including an exit nozzle structure 11, a main reactor pressure shell 12 that surrounds the active reactor-core portion, a series of side reflector modules indicated generally at 13 (Note FIG. 2), each of which includes a control drum actuator indicated generally at 14, a forward or front nuclear radiation or heat shield element 15, a front tube sheet element 16, and an active reactor-core portion indicated generally at 17, which core portion 17 incorporates a number of novel fuel elements indicated generally and schematically at 18 and which actually comprise the active portion of the said reactor core. The aforesaid modules 13 are disposed in circumferential relation to, and completely surround the outer circumference of the main reactor pressure shell 12 (Note FIG. 2).

The above noted reactor pressure shell 12 is actually formed by extending the nozzle structure 11 in a forward direction throughout the entire length of the reactor. In this manner, fabrication of the present arrangement is greatly simplified by the elimination of the usual problem required in joining the exit nozzle structure with the pressure shell. The outer part of the forward flange portion of the main reactor pressure shell 12 may be supported by the forward or front shield element 15, whereas the inner part of the said flange portion joins the front tube sheet element 16 which may be flexibly supported to provide differential radial expansions. The aforementioned supporting and/or connecting elements are not shown in detail, since they form no part of the present invention.

The previously-mentioned main reactor pressure shell 12 is formed with a plurality of open-ended, thin-walled coolant tubes which are brazed to the inner wall surface thereof. These pressure shell coolant tubes, several of which are indicated at the reference numeral 19, are arranged in closely packed and surrounding relation to the reactor core 17 and assist in providing a series of continuous coolant passages extending forwardly from the region of the exit nozzle structure 11 to a plenum in the heat shield element 15, as is illustrated at the reference numeral 20. In this connection, a portion of the nozzle structure 11 may be regeneratively cooled in a well known manner, as for example, by means of incorporating within the outer walls thereof a plurality of cooling tubes, passages or channels, one of which is indicated at the reference numeral 21 in FIG. 1. In this regard, an extra supply of hydrogen propellent may be stored in the main engine pressure supply tank (not shown) and introduced into the aforesaid nozzle coolant tubes 21 by way of the nozzle inlet manifold at 22. Main reactor pressure shell 12 is designed to resist internal loads due to a pressure differential that is formed across it and also because of the formation of certain thermal stresses. To facilitate resistance to the aforesaid internal loads, three mounting arrangements may be provided between the shell itself and the previously noted coolant tubes 19. In the first such arrangement shown in FIG. 1a, coolant tube 19a is depicted as being affixed to the surface of a single pressure shell at 12a. This mounting means substantially represents the embodiment used in the present invention. In FIG. 1b, however, a split shell configuration is used which consists of the inner and outer shells indicated at 12b and 12c. With this arrangement, an interior coolant passage 19b is formed therebetween. In the third form of FIG. 1c, a combination of both the split shell arrangement of FIG. 1b, as depicted at 12d and 12e, and the single shell form of FIG. 1a is utilized to thereby respectively form both an interiorily disposed coolant passage at 19c and a coolant tube at 19d. In each of the aforesaid mounting means, the resulting internal loads formed therewithin are depicted by means of a series of arrows, which are self explanatory.

The front or forward shield element 15, previously described in connection with FIG. 1, is actually formed into a plurality of individual, circular heavy metal plate elements which may be welded together along adjacent peripheries thereof to thereby eliminate any requirement for an additional external pressure vessel. A plurality of small coolant passages, indicated generally at 23, are formed within the aforesaid shield element 15 to thereby permit the passage of the hydrogen coolant therethrough prior to its entry into the reactor. These coolant passages 23 are staggered to reduce radiation streaming. Moreover, the inner portion of the said shield element acts as structural backbone for the present reactor assembly. Thus, both the present reactor and pressure shell elements are supported from the shield element 15, and the engine thrust created is transmitted through the shield element to the thrust structure. In addition, the inner portion of the said shield element also supports the outer, individual shield plate segments, each of which in turn supports a separate side reflector module 13, as is illustrated in FIG. 1. The local thermal stresses in the shield element 15 may be readily controlled through the proper selection of the diameter and spacing of the coolant passages 23.

As noted hereinbefore, the preferred embodiment includes a plurality of individual side reflector modules 13 (Note FIGS. 2 and 3). There is a separate side reflector module 13 exteriorly mounted to the outer circumference of each of the previously indicated individual circular plate segments welded together and collectively comprising the front shield element 15. With particular reference to FIGS. 1 and 3, it is seen that each separate reflector module 13 actually constitutes an integral package containing the necessary supporting structure consisting of an outer reflector module pressure shell or pipe 24, which encloses the nuclear reflector material indicated generally at 25 in FIG. 3 and, in addition, is supported from a particular individual plate segment of the heat shield element 15, previously described. This reflector material 25 is actually further enclosed within a cylindrical control drum element 26, which control drum element 26 contains both neutron-reflecting material that is generally indicated at the aforesaid reference numeral 25, and neutron-absorber material indicated at the reference numeral 27, which in one embodiment may consist of a series of neutron absorbing rods formed in relatively enlarged holes incorporated within each control drum element 26.

The aforesaid reflector structure-pressure shell or pipe 24 is designed to resist the differential pressure between the hydrogen propellant and the vacuum of space. Moreover, each of said shells or pipes 24 incorporate a plurality of small coolant tubes 28, brazed to the inside circumference and along the periphery thereof. These coolant tubes 28 are actually within the space provided between the pressure shell or pipe 24 and the control drum element 26, and they are provided to insure nearly uniform skin temperatures circumferentially around the outermost structure of each module 13.

The previously mentioned control drum element 26 effects reactor control by being rotatable within the aforementioned outer pressure shell or pipe 24 to thereby position the absorber material 27 incorporated therewithin relative to the active core portion 17 of the present reactor. The neutron-reflecting material 25 may consist of the metal beryllium, since the latter material permits a simple and lightweight design and may also serve as the control drum structure itself. A plurality of axial and relatively elongated holes or passages may be provided in the aforesaid beryllium material as illustrated at 29 (FIG. 3) for the purpose of permitting the flow of hydrogen coolant therethrough. The previously described neutron absorber material or rods 27 are located in a series of relatively large holes or passages, illustrated by reference numerals 27, and which are positioned along approximately 105° of the total periphery of each control drum element 26, as is clearly indicated in the aforesaid FIG. 3. In this manner, accurate, simple and flexible control of the active core portion of the present reactor may be easily effected.

Bearings for the control drum element 26 are located at each end thereof, as is generally indicated at the reference numerals 26a and 26b (FIG. 1), and the axial thrust produced is transmitted through these bearings. If it is found nuclearly desirable, for better reactor core control purposes, the void between adjacently-positioned side reflector modules 13, and the main reactor pressure shell 12, may be reduced by the use of filler blocks shown at 35 (FIG. 3). These filler blocks 35 each consist of a thin wall tube containing neutron reflecting material and are supported in position by adjacent modules 13. Axially oriented passages may also be incorporated in the filler blocks 35, as shown at 35a, again for the purposes of permitting the flow of coolant therethrough, which coolant may be supplied from the module plenums in any appropriate manner.

The previously referred to control drum actuator 14 (FIG. 1) may be of an already developed design used in an existing program and, although its specific structure is not important to the present invention and is therefore not shown in detail, it generally consists of a piston actuator whose linear motion is converted to a 180° rotary motion by means of a rack and pinion method. Normally, this control actuator acts against the force of a scram spring indicated at 30. However, said actuator is also designed to assist in the scram action to provide added protection in the unlikely event of a spring failure. As seen in the aforesaid FIG. 1, each of the control actuators 14 is actually, in the present embodiment, an integral part of a respective side reflector module 13 and is naturally operative to control the rotative position of the control drum element 26 and, of course, the neutron-reflecting and absorbing material incorporated therewithin relative to the reactor core itself as previously noted. Also, as clearly illustrated in the aforesaid FIG. 1, the supporting structure indicated generally at 31 and 32 respectively supports the control drum actuator 14 and the control drum actuating shaft 33 to thereby form an integral part of a corresponding side reflector module 13 and, in the case of the structure 31, to actually provide the support of the module 13 and control drum actuator 14 to the corresponding individual plate segment of the shield element 15. The area along which these two elements are cojoined is indicated generally by the reference numeral at 34. Moreover, each of the aforesaid control drum actuator-supporting structures 31 incorporates a series of coolant passages or tubes 36 which may communicate with the already described passages 28 formed in each module 13.

With specific reference to FIGS. 4 and 5, one form of the reactor front tube sheet which may be used with the present invention is shown generally at 16 as consisting of a circular plate element, perforated with a plurality of circular holes 36, which holes are counterbored (Note FIG. 5) to relatively short depths in order to accommodate or receive the forward or front ends of the corresponding fuel elements 18 comprising the active portion of the reactor core. The outer periphery of the tube sheet 16 may be machined to reduce its total weight and to prevent large temperature differences to exist across the radius of the tube sheet. Said tube sheet 16 may be further attached to the inner portion of the radiation shield element 15 by means of a structural cylindrical element which may be adapted to provide both support for the tube sheet itself and to permit differential radial expansion relative to the main pressure shell 12. Also the connection therebetween may be welded to assure sealing between the various coolant flow passages. The foregoing elements are not illustrated in detail since they form no part of the present invention. The aforesaid tube sheet 16 may be cooled by the direct passage therethrough of hydrogen coolant during the passage of the latter material from the coolant passages 23 formed in the shield element 15 into the inlet end of the active portion of the reactor core.

The aforementioned active portion of the reactor core 17 of the present invention consists of the previously noted plurality of fuel elements 18, which fuel elements are fastened within the previously described, counterbored circular holes 36 formed in the reactor front tube sheet 16. Each of the said fuel elements 18, one of which is shown in detail in the view of FIG. 6, and in schematic form in FIG. 7, consists of an active core section at 18a, a nose piece element at 18b and a tail piece element at 18c. It is this nose piece 18b which is fastened within the holes 36 in the reactor tube sheet 16 as generally shown by the means at 36a in FIG. 1. On the other hand, the rear or aft ends of each of said plurality of fuel elements are interconnected to each other to maintain the proper clearance between each respective element thereof.

The active core or fueled section of each fuel element 18 may contain or consist of an appropriate matrix material, such as $W-UO_2$, which may be clad with a material such as a referactory metal alloy. The phenomenon known as reactor radial power flattening is accomplished by a reduction in the fuel concentration therein toward the centerline of the active core. The latter effect is accomplished by changing the percentage of $UO_2$ or other material in the fuel matrix. Since the fuel element shown is built up axially with a number of fueled segments, axial power tailoring through fuel variations may be also readily accomplished.

As stated hereinabove, the aforesaid nose piece 18b, at the forward end of the fuel element 18, connects the particular element against or to the forward tube sheet 16. For this purpose, a threaded fastener or other similar element, such as is illustrated generally at 37 in FIG. 1, may be used to seal the face of each nose piece against the forward tube sheet 16. Furthermore, an integral form of a seal ring (not shown) may be utilized to position or locate the nose piece of each fuel element in the appropriate counterbored hole 36 provided therefor in the said tube sheet. Furthermore, the aforesaid nose piece may be machined and joined to its particular fuel element 18 through means of diffusion bonding. The tail piece 18c may also be configured to thereby transition from a perforated plate form to a circular ring form connected with the adjacently positioned tail piece element of each of the plurality of fuel elements 18 to thus provide radial restraint therebetween. Again, each tail piece 18c may be joined to the fueled section 18a by means of diffusion bonding.

The foregoing series of fuel elements, 18, which form a unique feature of the present invention, are arranged in a closely packed assembly that is hexagonal in cross section. However, other cross-sectional configurations are usable with the present invention. Further, each fuel element 18 incorporates or is pierced with a series of coolant holes or passages, as indicated generally at 38 in the schematic fuel element form of FIG. 7. These channels may be triangularly or otherwise arranged in a matrix of refractory metal and oxide fuel. The improved feature of the aforesaid coolant passages 38 is that, in accordance with the teachings of the present invention, the amount of coolant required to counteract the excessive increase in afterheat resulting after reactor shutdown may be minimized in a novel manner by programming the size and distribution of the aforesaid coolant passages 38 in accordance with the actual heat generated. Thus, the present invention performs this unique programming function by equipping the previously described fuel elements 18 with a series of coolant passages as at 38 in FIG. 7 which are varied in both size and distribution to match or substantially match the local heat generated in the fuel elements 18 in accordance with, or in measured proportion to the radial distance from the center of the core. To this end, and to correspond with previously computed locat heat generation in the reactor core at various radial distances, the present invention provides the above noted matching capability between the local heat generated and the capability to efficiently remove the heat so generated to respectable and acceptable temperature ranges, by teaching the utilizing of relatively larger coolant holes 38 near the center of the reactor core and then progressively decreasing the size of such coolant passages as the outer surface of the core is approached. In this manner, the amount of additional hydrogen coolant required to be used for afterheat purposes may be significantly reduced and more efficient space missions accomplished. Of course, the foregoing objective of minimizing the required coolant may be alternatively accomplished either by using uniform hole spacings, in which event, fuel loading will have to be increased in regions of larger hole sizes to increase the local power density, or if the hole spacings are varied with the radial distance in addition to the variation in hole size, the necessary coolant minimization can be achieved in a radially power flattened core. Of course, as a practical matter, rather than vary either the hole size or spacing within a single fuel element, small temperature excesses due to small power variations may be more acceptable than the increased tooling and fabrication costs. In any event, the present invention teaches that, by utilizing larger than average coolant channels, as at 38, at the center of the reactor core, followed by decreasing size coolant channels towards the core periphery and/or additionally varying the number or spacing of the channels outwardly from the reactor core center, not only will the required coolant be materially reduced but also a net effect of achieving higher and therefore more efficient average core temperatures will be the result throughout the reactor core during aftercooling. The latter is accomplished in the present invention specifically by using the same number of coolant channels 38 for each fuel element 18 and decreasing the sizes of the holes in each element as the distance increases outwardly from the core center except near the core boundary when the power increases. The latter configuration is effected for each fuel element 18, except for the peripheral fuel elements. In the latter elements, the hole or channel sizes 38 are varied as in the other fuel elements but the number of holes or channels 38 incorporated therein are increased as a means of reducing the largest holes to sizes commensurate with the typical sizes for the whole reactor core. In this regard, although in the design tested only two hole spacings were utilized, it is obvious that other specific arrangements applicable to different reactor core designs could be used without departing from the true spirit or scope of the present invention. Accordingly, because of the resulting increased core boundary temperature, the heat transferred to the counter-flowing coolant in the surrounding core shell and therefore the temperatures of the coolant entering the core itself are increased. Thus, with the same local temperature ratios as limited by laminar flow characteristics experienced during aftercooling, the level of the radial maximum exit temperature can be increased with further decreases in the required coolant flow rate. The latter effect naturally increases the efficiency of the nuclear powered rocket engine, since the radial temperature distribution across the core of the reactor for rocket application should be as uniform as possible in order to achieve as high an exit gas temperature as possible. The present invention uniquely achieves this objective by radially varying the hydraulic diameters of the coolant passages, such as at 38, across the reactor core as previously noted to thereby achieve a uniform radial temperature distribution.

With the foregoing arrangement, therefore, improved aftercooling is effected by the combined effect of the propellant coolant, such as hydrogen, initially flowing from the nozzle-coolant tubes at 21 forwardly through the pressure shell-coolant tubes 19, from whence it enters each of said modules 13, by way of a first, relatively short flexible tube at 39, into the coolant tubes 28 provided in the space formed between the module-outer pressure shell 24 and the outer peripheral wall of the control drum element 26. This coolant flow enters the aforesaid module coolant tubes 28 at a position ahead of the shield element 15 to thus flow in a rearward or aft direction therethrough and immediately thereafter reverse its direction of flow to then pass through both coolant passages 29 provided in the control drum element 26 and the control shaft 33, which is hollow in form to thereby provide still another coolant passage. From this point, the coolant flow proceeds or exits through a second, relatively elongated, flexible tube 40 to thereafter continue in its coolant flow through the coolant passages 23 formed in the heat shield element 15 by way of the latter's plenum at 20. The aforesaid hydrogen coolant passes through the said shield passages 23 and enters the reactor core to pass therethrough by way of the previously described, programmed coolant passages 38 uniquely arranged so as to provide the necessary aftercooling with a minimum expenditure of propellant.

While a preferred embodiment of the present invention has been shown and described for purposes of exemplification, it is apparent that many modifications and changes may be made without departing from the true spirit and/or scope of the invention, as defined hereinafter in the accompanying claims.

I claim:

1. In a nuclear rocket engine, reactor-shield assembly; an exit nozzle portion; a main reactor having a pressure shell; an active reactor core portion contained within said main reactor pressure shell; a heat shield element attached to, and supporting said main reactor pressure shell; combined neutron-reflecting and neutron-absorbing material means for controlling said active reactor core; and combined propellant-andcoolant continuous flow passage means incorporated within said reactor-shield assembly providing a continuous flow of propellant and coolant in said assembly between said exit nozzle portion and the reactor inlet, said active reactor core portion incorporating a plurality of coolant channels of variable hydraulic diameters decreasing in the direction of the core periphery in accordance with a programmed sequence to thereby match the decreasing heat generated in the reactor core at increasing radial distances from the core center.

2. In a nuclear rocket engine, reactor-shield assembly as in claim 1, wherein said plurality of coolant channels are formed and equally spaced in a series of reactor core-fueled elements, each having different hydraulic diameters of predetermined variable sizes measured outwardly towards the core periphery to thereby provide for the flow of coolant therethrough substantially matching and dissipating the local heat generated at various radial distances during the reactor shutdown-aftercooling period and also to counteract the reduced peripheral temperatures caused by the increase in relative heat loss to the surrounding core structure.

3. In a muclear rocket engine, reactor-shield assembly as in claim 2, wherein the coolant channels formed in said fueled-elements vary in spacing from one element to the other in all of said elements except for the peripheral fueled elements.

4. In a nuclear rocket engine, reactor-shield assembly as in claim 3, wherein said active reactor core portion incorporates peripheral fueled elements having variable-sized coolant channels greater in number than that of the remainder of said fueled elements to thereby more nearly equalize the larger-sized holes formed therewithin and typical throughout the whole reactor core.

* * * * *